United States Patent [19]
Costa

[11] Patent Number: 5,716,187
[45] Date of Patent: *Feb. 10, 1998

[54] TWO-AXIS CARTESIAN ROBOT

[76] Inventor: Larry J. Costa, 54201 Ash Rd., Osceola, Ind. 46561

[*] Notice: The term of this patent shall not extend beyond the expiration date of Pat. No. 5,324,163.

[21] Appl. No.: 398,884

[22] Filed: Mar. 6, 1995

Related U.S. Application Data

[63] Continuation-in-part of Ser. No. 343,136, Nov. 22, 1994, Pat. No. 5,476,358, which is a continuation of Ser. No. 887,317, May 22, 1992, abandoned.

[51] Int. Cl.⁶ ............................................. B25J 5/04
[52] U.S. Cl. ........................... 414/751; 74/490.04; 901/21
[58] Field of Search ..................... 414/749, 751–753; 901/21; 74/490.04, 490.08, 490.09, 89.2, 89.21, 89.22

[56] References Cited

U.S. PATENT DOCUMENTS

| | | | |
|---|---|---|---|
| 465,109 | 12/1891 | Dixon . | |
| 3,344,933 | 10/1967 | Jelatis et al. | 212/24 |
| 4,243,147 | 1/1981 | Twitchell et al. | 212/159 |
| 4,417,845 | 11/1983 | Burton | 414/733 |
| 4,770,598 | 9/1988 | Kotani | 414/752 |
| 4,820,109 | 4/1989 | Witt | 414/282 |
| 4,842,476 | 6/1989 | Shiotani | 414/751 |
| 4,922,173 | 5/1990 | Lawler | 318/568.2 |
| 5,324,163 | 6/1994 | Costa | 414/571 |

FOREIGN PATENT DOCUMENTS

| | | |
|---|---|---|
| 151362 | 5/1904 | Germany . |

*Primary Examiner*—Donald W. Underwood
*Attorney, Agent, or Firm*—Zarley, McKee, Thomte, Voorhees & Sease; Dennis L. Thomte

[57] ABSTRACT

A two-axis Cartesian robot is described comprising a first horizontally disposed support having a first carriage selectively movably mounted thereon. A second support is operatively secured to the first carriage and extends perpendicularly from the longitudinal axis of the first support. A second carriage is vertically movably mounted on said second support. A belt pulley is rotated by a reversible drive motor. A drive belt is driven by the drive motor and operatively connected to the upper and lower ends of the second support by a pulley arrangement. Horizontal and vertical brakes are provided to control the horizontal movement of the first carriage and the vertical movement of the second carriage. A workpiece gripper or handling member is mounted on the second carriage for movement therewith.

4 Claims, 3 Drawing Sheets

TWO-AXIS CARTESIAN ROBOT

This is a continuation-in-part application of application Ser. No. 08/343,136 filed Nov. 22, 1994, entitled "Three-Axis Cartesian Robot", which issued as U.S. Pat. No. 5,476,358 on Dec. 19, 1995, which is a continuation application of application Ser. No. 07/887,317 filed May 22, 1992, now abandoned.

BACKGROUND OF THE INVENTION

1. Field of the Invention

This invention relates to a Cartesian robot and more particularly to a two-axis Cartesian robot.

2. Description of the Prior Art

Many types of robotic designs have been previously provided, but they all suffer from one or more shortcomings. To the best of applicant's knowledge, other than the robot described in the co-pending application, the prior Cartesian robot devices require one drive motor for each axis of movement.

During the production of the robot described in the co-pending application, it was discovered that a two-axis Cartesian robot provided many advantages over the three-axis design. The basic principle of the robot described herein is similar to that described in the co-pending application, except that the robot operates along two axes instead of three.

SUMMARY OF THE INVENTION

A two-axis Cartesian robot is described which includes a single drive motor for driving the robot in two directions of movement, namely the Y and Z axes.

The robot of this invention includes a first horizontally disposed support having a carriage longitudinally movably mounted thereon. A selectively reversible drive motor is mounted on one end of the first support and has a rotatable drive shaft provided thereon. A synchronous belt drive pulley is mounted on the drive shaft that has an upper and lower belt member wrapped therearound, with the upper and lower belt members extending therefrom in a direction parallel to the longitudinal axis of the first support. A vertically disposed second support is vertically mounted on the first carriage. A first brake is operatively connected to the first carriage for selectively limiting the movement of the first carriage with respect to the first support. A second carriage is mounted on the vertically disposed second support. A second brake is operatively secured to the second carriage for selectively limiting the vertical movement of the second carriage relative to the second support. The synchronous belt members are operatively connected to the second carriage so that the robot may be moved in the Y and Z axes. The design of the system of this invention consists of two axes of motion with only a single drive mechanism.

It is therefore the principal object of the invention to provide a two-axis Cartesian robot design.

Yet another object of the invention is to provide a two-axis Cartesian robot requiring only one axis of drive motion for the two axes of movement.

Still another object of the invention is to provide a two-axis Cartesian robot employing a synchronous belt wrapped around a synchronous belt drive pulley.

Still another object of the invention is to provide a unique braking system for a two-axis Cartesian robot to achieve movement of the robot in two directions, namely Y and Z axes.

Still another object of the invention is to provide a two-axis Cartesian robot which is economical of manufacture, durable in use and refined in appearance.

These and other objects will be apparent to those skilled in the art.

DESCRIPTION OF THE PREFERRED EMBODIMENT

Figure 1:
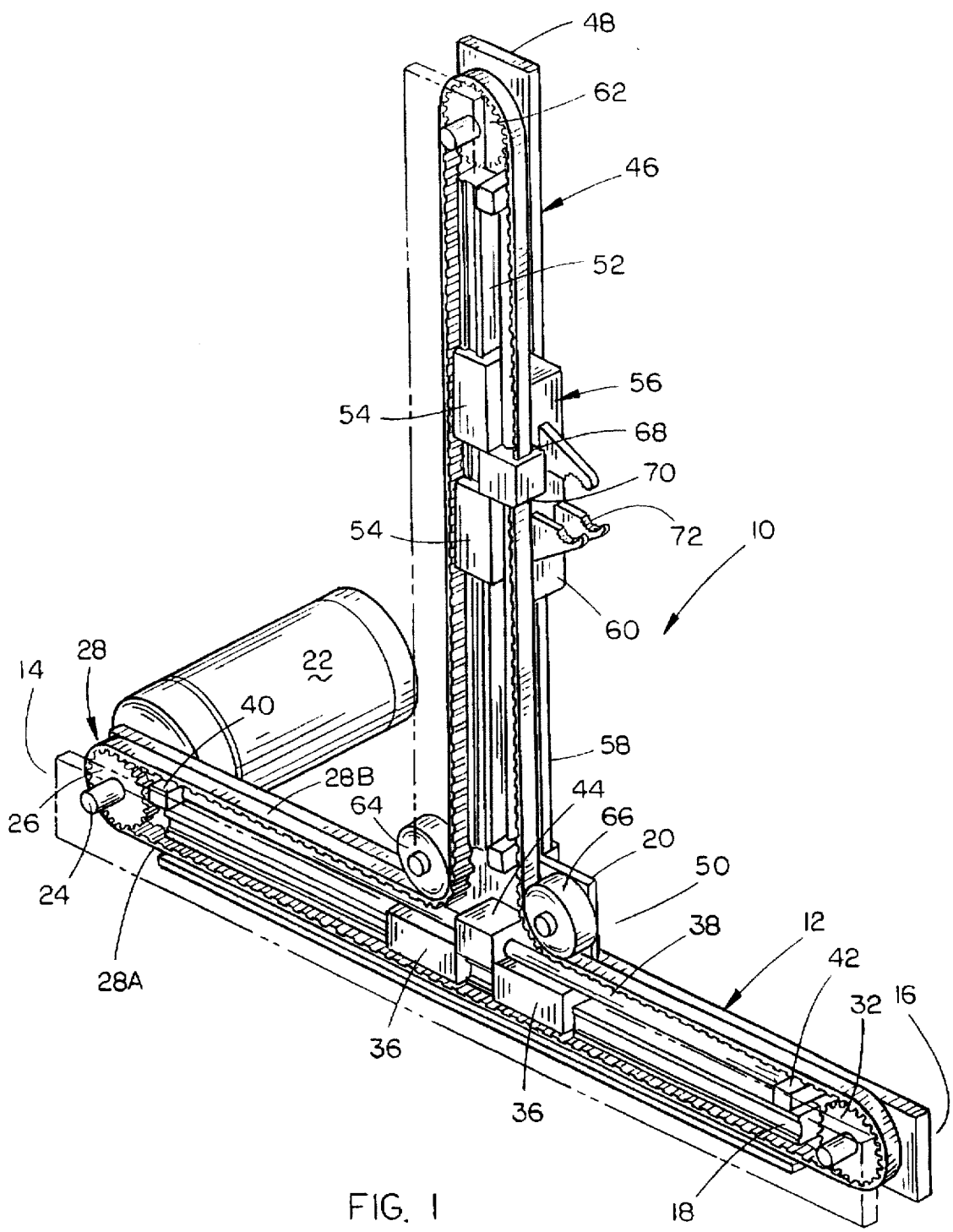
FIG. 1 is a perspective view of the robot of this invention with portions thereof cut away to more fully illustrate the invention.
Figure 2:
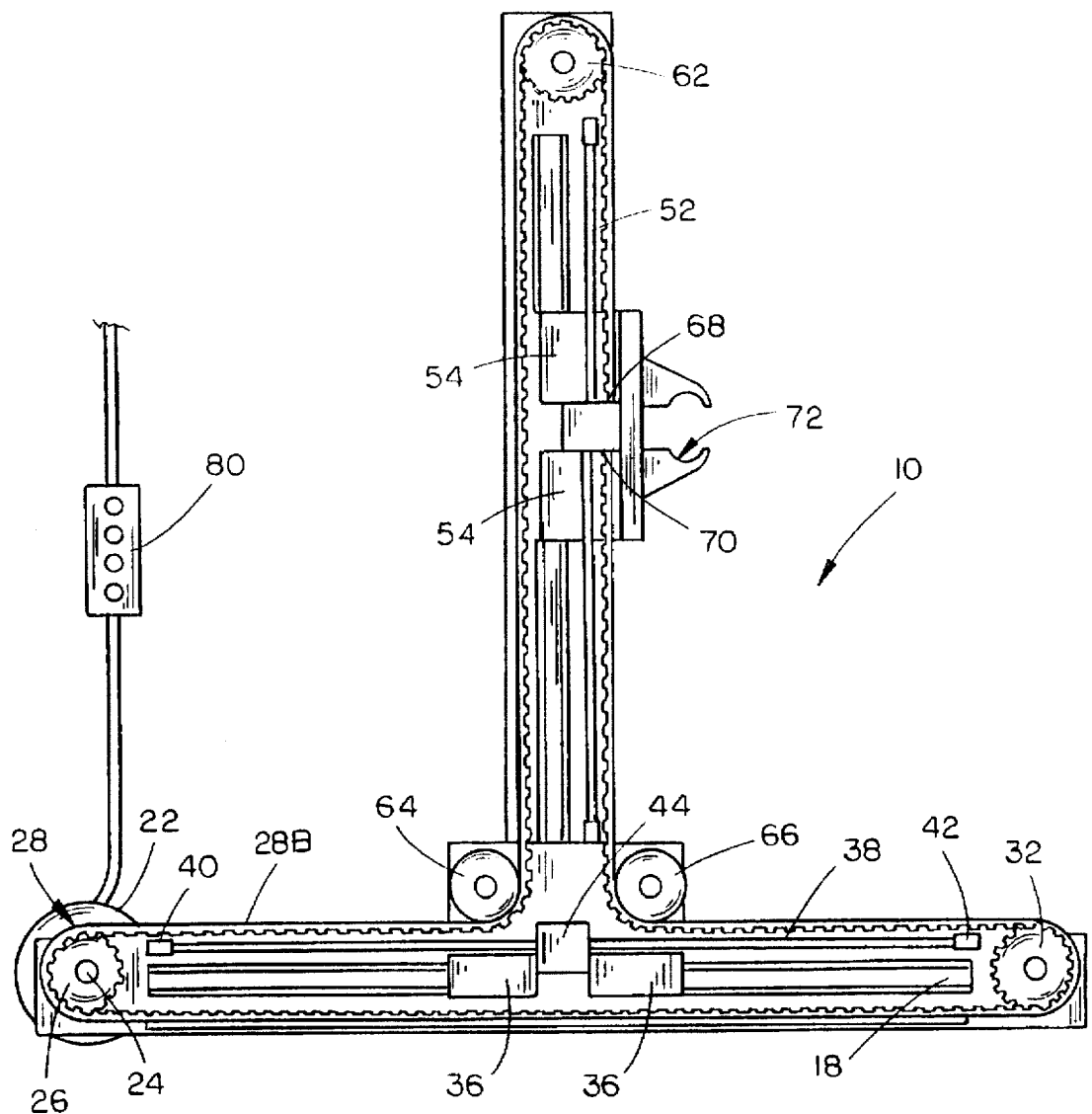
FIG. 2 is a front view of the robot of this invention.
Figure 3:
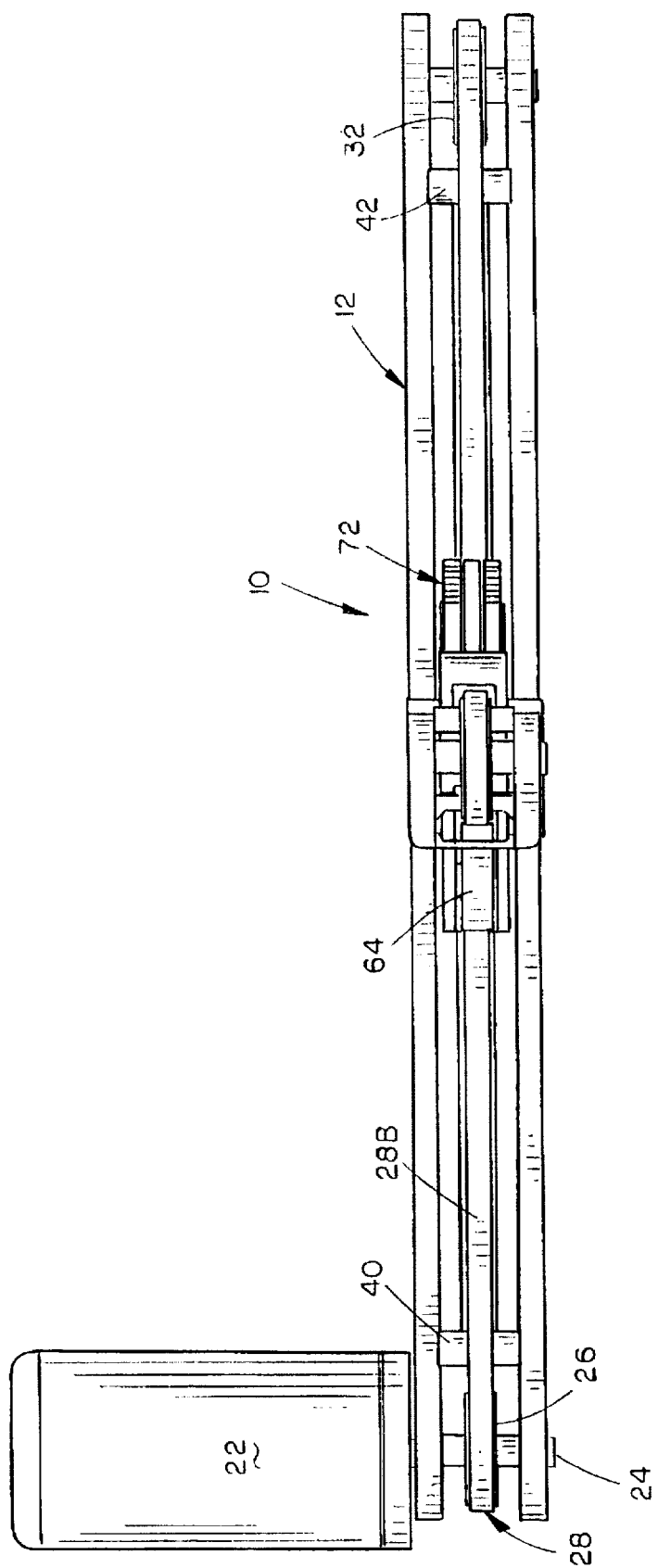
FIG. 3 is a top view of the robot.

Referring to FIG. 1, the numeral 10 refers generally to the two-axis Cartesian robot of this invention. Robot 10 includes a first support 12 which is horizontally disposed and which has opposite ends 14 and 16. Support 12 includes a laterally presented linear bearing way design 18 upon which is movably mounted linear bearings 36 and first carriage 20 as will be described in more detail hereinafter.

Reversible drive motor 22 is mounted on support 12 adjacent end 14 and has a horizontally disposed drive shaft 24 extending therefrom. The numeral 26 refers to a conventional synchronous belt drive pulley mounted on shaft 24. Synchronous belt member 28 is wrapped around pulley 26 and includes a lower portion 28A and a upper portion 28B. Thus, rotation of pulley 26 in a counterclockwise direction, as viewed in FIG. 1, will cause the belt portion 28A of synchronous belt member 28 to play-out from pulley 26 and will cause belt portion 28B of synchronous belt member 28 to be taken-up on the pulley 26. Conversely, rotation of the synchronous belt pulley 26 in a direction opposite to that just described (clockwise) will cause the belt portion 28B of synchronous belt member 28 to be played-out from pulley 26 and will cause belt portion 28A of synchronous belt member 28 to be taken-up on pulley 26. The numeral 32 refers to a first idler pulley which is rotatably mounted on support 12 adjacent end 16 with the axis of rotation of the idler pulley 32 being parallel with respect to horizontal.

First carriage 20 is longitudinally movably mounted on support 12 by means of the conventional linear bearing design 36 slidably receiving the conventional linear bearing way design 18 of the support 12. As seen in FIG. 1, the numeral 38 refers to an elongated rod which is horizontally disposed and which extends between the brackets 40 and 42 mounted on support 12. The numeral 44 refers to a conventional brake which is mounted on carriage 20 and which is adapted to selectively grip rod 38 in a braking relationship so as to selectively prevent the movement of carriage 20 relative to support 12 as desired.

The numeral 46 refers to a vertically disposed second support which is mounted on carriage 20 and which has an upper end 48 and a lower end 50. Second support 46 includes a conventional linear bearing way design 52 on which conventional linear bearings 54 are slidably mounted. A second carriage 56 is operatively secured to the linear bearings 54 to enable carriage 56 to move vertically with respect to support 46. A vertically disposed, elongated rod 58 has its upper and lower ends secured to the upper and lower ends 48 and 50 of support 46. The numeral 60 refers to a conventional brake mounted on second carriage 56 which is adapted to selectively engage rod 58 in a braking relationship to prevent movement of the second carriage 56 relative to second support 46 as desired.

An idler pulley 62 is rotatably mounted on the upper end of support 46 as seen in FIG. 1. Idler pulleys 64 and 66 are rotatably mounted on carriage 20 with the axes of rotation thereof being disposed in a horizontal orientation as also seen in FIG. 1.

As seen in FIG. 1, the upper portion of belt member 28 extends from pulley 26, thence around idler pulley 64, thence upwardly around idler pulley 62, thence downwardly for fixed connection with the second carriage 56 at 68.

The lower portion of belt member 28 extends from pulley 26, thence around idler pulley 32, and thence around idler pulley 66 and thence upwardly for fixed connection to second carriage 56 at 70. As seen, second carriage 56 has a workpiece handling or gripping means 72 to grasp or otherwise maneuver the load or workpiece to be manipulated.

In operation, via control means 80, assuming that brakes 44 and 60 are initially engaged with their respective rods 38 and 58, first carriage 20, and second carriage, 56, may be moved horizontally, with respect to support 12, by operating drive motor 22 and disengaging brake 44 which serves as a horizontal brake. Second carriage 56 may be selectively moved vertically, with respect to support 46, by operating drive motor 22 and disengaging brake 60, which serves as a vertical brake.

More particularly, assuming that the operator desires to move the workpiece handling means 72 to the left as viewed in FIG. 1, horizontal brake 44 is disengaged from its braking engagement with rod 38. Rotation of pulley 26, by motor 22, in a counterclockwise direction as viewed in FIG. 1, will cause the upper belt portion 28B to be taken-up on pulley 26 which in turn causes the second support 46 to be moved to the left, as viewed in FIG. 1, since the belt 28 is fixed to carriage 56 at 68. Conversely, rotation of the pulley 26 in a clockwise direction, as viewed in FIG. 1, with brake 44 disengaged, the second support 46 will move to the right, as viewed in FIG. 1, due to the fixed connection of the belt 28 with the carriage 56 at 70.

If it desired to move the gripping means 72 in a vertical direction, with respect to support 12, the vertical brake 60 is disengaged. With brake 60 disengaged, rotation of pulley 26 in a clockwise direction, as viewed in FIG. 1, will cause the carriage 56 to be moved downwardly towards support 12. Conversely, rotation of pulley 26 in a counterclockwise direction, as viewed in FIG. 1, will cause the carriage 56 to be moved upwardly with respect to support 12. The upward and downward movement of the carriage 56 is achieved by the fact that the belt member 28 is connected to the carriage 56 at 68 and 70, as previously described.

As stated, the second carriage 56 includes the necessary conventional gripping components 72 positioned thereon to grasp or move the workpieces being manipulated. The configuration of workpiece handling or gripping means 72 will obviously depend on the task to be performed on a particular workpiece. Further, the robot would include the necessary conventional controls 80 to operate the conventional drive motor 22, conventional brakes 44 and 60 and apparatus 72. Although it is preferred that a belt means be utilized in this invention, a cable could be substituted for the belt if so desired.

Thus, it can be seen that a novel two-axis Cartesian robot has been provided which requires only a single axis of drive motion for the two axes of movement. It can also be seen that the robot of this invention achieves all of the stated objectives.

I claim:
1. A two-axis Cartesian robot, comprising:
   a first elongated and horizontally disposed first support means having first and second ends;
   said first support means having a first belt pulley rotatably mounted thereon adjacent its said first end, said first support means having a first idler pulley mounted thereon adjacent its said second end;
   a first carriage longitudinally movably mounted on said first support means;
   said first carriage having second and third idler pulleys rotatably mounted thereon;
   a first brake means associated with said first carriage for selectively preventing the horizontal movement of said first carriage with respect to said first support means;
   a second elongated and vertically disposed support means secured to and extending upwardly from said first carriage in a direction perpendicular to the longitudinal axis of said first support means;
   said second support means having a fourth idler pulley rotatably mounted at its upper end;
   a second carriage vertically movably mounted on said second support means;
   a second brake means associated with said second carriage for selectively preventing the vertical movement of said second carriage with respect to said second support means;
   a reversible drive motor mounted on said first support means adjacent the said first end thereof and being operatively connected to said first belt pulley;
   an elongated flexible belt means for selectively horizontally moving said first carriage with respect to said first support means and for selectively vertically moving said second carriage with respect to said second support;
   said belt means extending downwardly from a fixed connection with said second carriage, thence beneath and around said third idler pulley, thence towards said second end of said first support means, thence around said second idler pulley, thence towards said first end of said first support means, thence beneath and around said belt pulley, thence beneath and around said second idler pulley, thence upwardly towards said fourth idler pulley, thence around and over said fourth idler pulley, thence downwardly to a fixed connection with said second carriage;
   a handling apparatus operatively secured to said second carriage;
   and control means for controlling the operation of said drive motor means, said first brake means and said second brake means.

2. The robot of claim 1 wherein said first brake means comprises a horizontal brake and said second brake means comprises a vertical brake.

3. The robot of claim 1 wherein a first elongated rod extends between said first and second ends of said first support and wherein said first brake means is mounted on said first carriage and is in selective braking engagement with said first rod.

4. The robot of claim 3 wherein a second elongated rod extends between the upper end and lower ends of said second support and wherein said second brake means is mounted on said second carriage and is in selective braking engagement with said second elongated rod.

* * * * *